Dec. 30, 1930.  E. RUBIN  1,787,325
AIRCRAFT
Filed Oct. 18, 1929   2 Sheets-Sheet 2

Inventor
*Ernest Rubin*

By *Ernest Phelps*
Attorneys

Patented Dec. 30, 1930

1,787,325

UNITED STATES PATENT OFFICE

ERNEST RUBIN, OF ATLANTA, GEORGIA

AIRCRAFT

Application filed October 18, 1929. Serial No. 400,638.

This invention relates to aircraft of the heavier-than-air type.

Generally, it is aimed to provide a novel, relatively inexpensive, durable and practical construction wherein one or more driven horizontal and vertical propellers coact to enable lifting of greater loads or weights than heretofore and more direct or practically vertical ascent.

Another main object is to provide a construction wherein driven vertical propellers so impinge upon the air as to force or maintain streams, or bodies of dense, compressed and rapidly moving air directly upon or against horizontal or lifting propellers, to react on the blades of the latter with resultant upward force that lifts the machine.

A further object is to provide in aircraft attaining the ends mentioned, a front and a set of rear vertical propellers with a set of horizontal propellers between the same, so arranged that the speed of rotation of the first mentioned set may be varied and the direction of projecting air reversed relative to the front vertical propeller and for rendering the horizontal lifting propellers inactive while the other propellers operate for varying the speed of one horizontal or lifting propeller relative to the other one.

Various additional objects and advantages will appear in the following detailed description, considered with the accompanying two sheets of drawings, depicting one operative embodiment.

In said drawings:—

Figure 1:
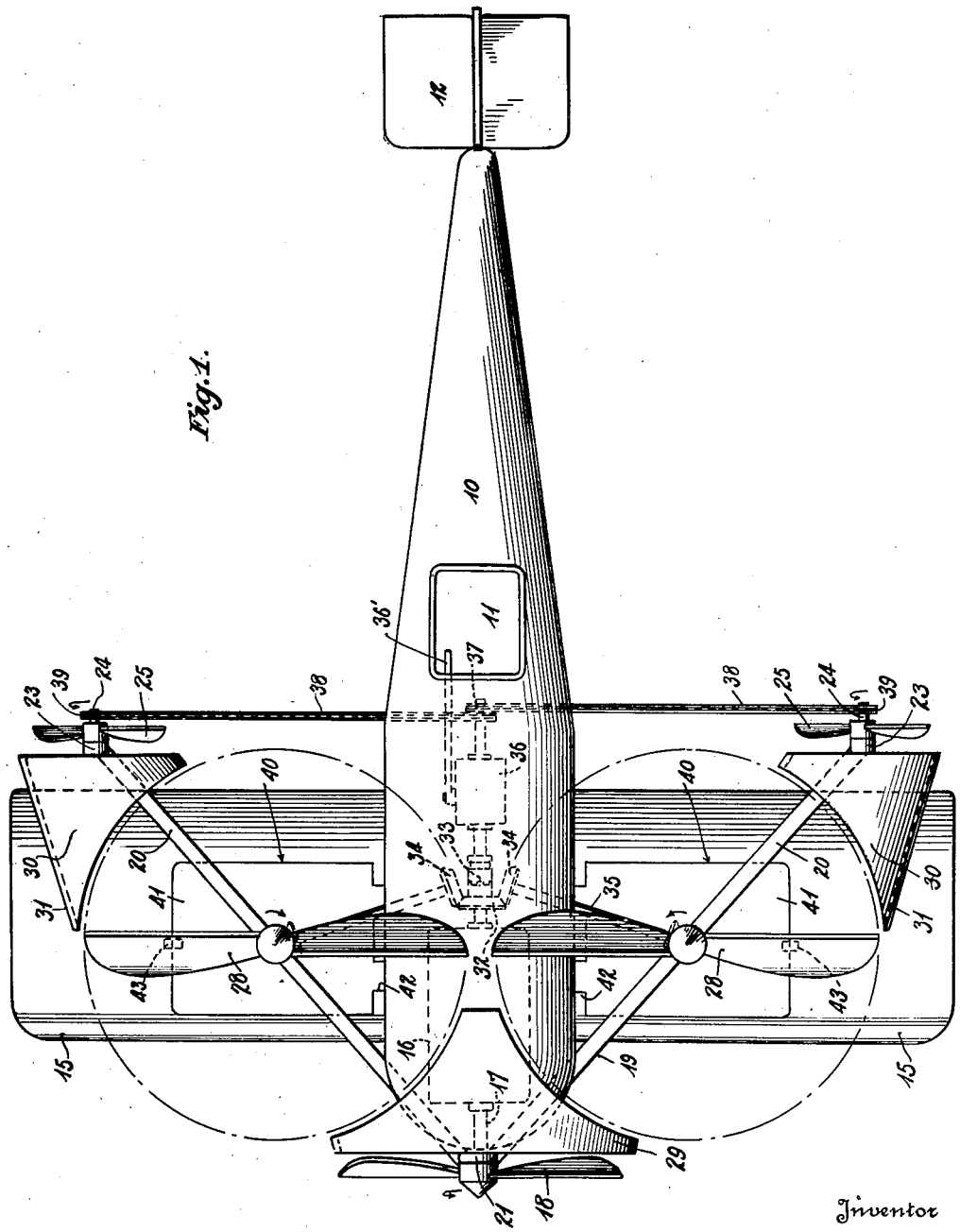
Fig. 1 is a plan view of the aircraft.
Figures 2, 3:
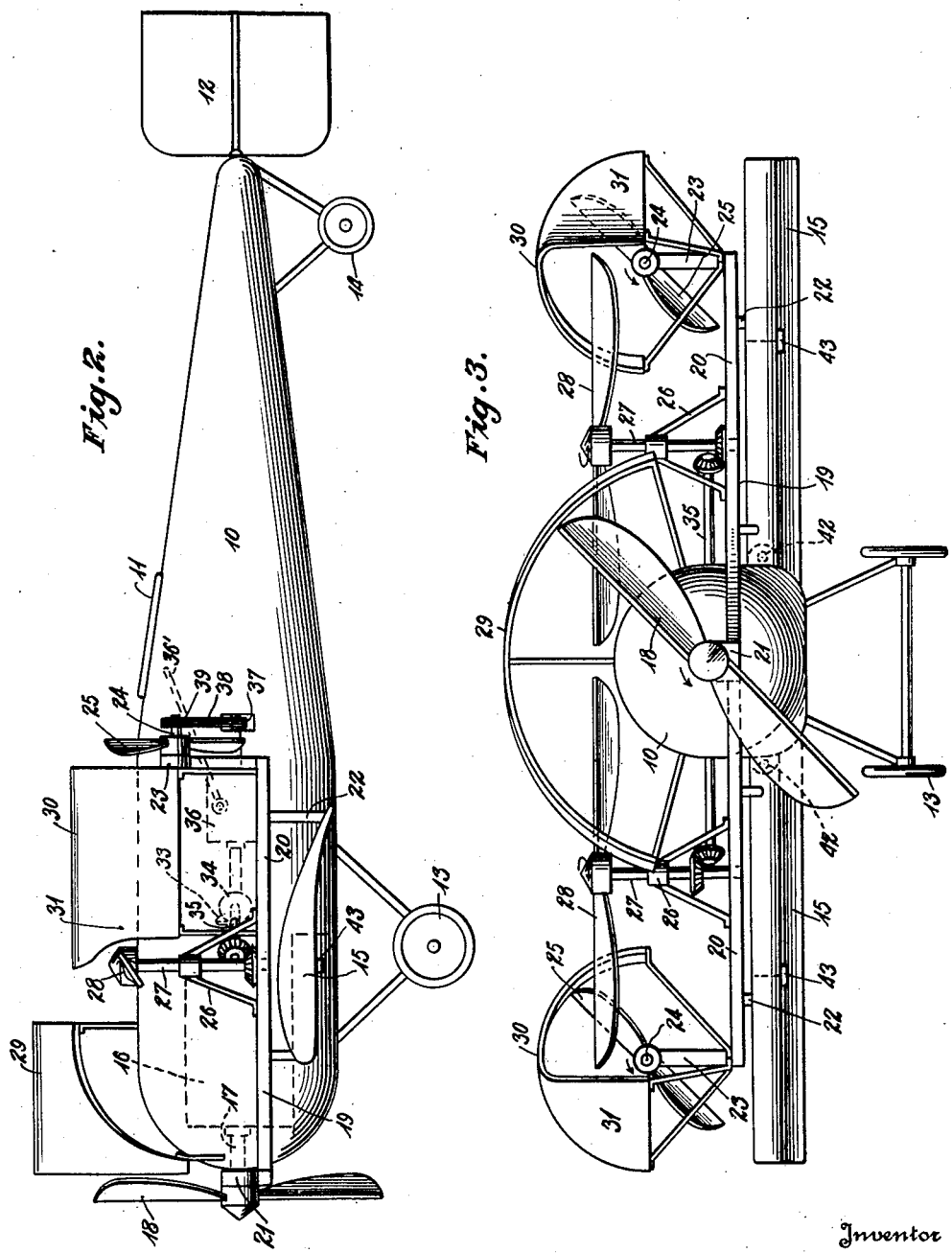
Fig. 2 is a side elevation thereof.
Fig. 3 is a front elevation of the same.

Referring specifically to the drawings, wherein like reference characters designate like or corresponding parts, 10 designates a conventional fuselage built according to the uses for which the aircraft is designed, of which 11 designates the cockpit, 12 the rudder, 13 conventional front ground wheels and 14 a conventional rear ground wheel.

While not absolutely essential, planes or wings 15 are employed, with respect to which the fuselage 10 is centered, and which are preferably of the underslung or low type.

A propelling motor 16 is mounted in the forward end of said fuselage and its main shaft 17 has a central vertical propeller 18 fixed thereon in front of the wings. A V-shaped or equivalent frame 19 is suitably fastened to the fuselage, the apex of the legs 20 of which is adjacent said propeller 18 and carries a bearing 21 in which said shaft 17 is journaled. The wings and frame are mutually braced and connected by short upright rods 22.

Bearings 23 at the rear ends of the legs 20 journal short shafts 24 on which vertical propellers 25, equidistantly spaced from the fuselage, are keyed. Bearings 26 midway of the ends of legs 20 mount and journal vertical shafts 27 to which horizontal or lifting propellers 28 are keyed.

Each of the propellers 18, 25 and 28 is of conventional form although propellers 28 may be larger and stronger than usually employed; each of the propellers is adapted to be driven from the engine 16 and during normal advance or flight, the propeller 18 operates in the reverse direction to propeller 25 while the propellers 28 are idle or still. For vertical flight or ascending, the propellers 28 operate in reverse rotation and the propellers 18 and 25 operate in the same direction. The blades of the propellers 25 are constructed so as to be reversed to the blades of the propeller 18.

An important feature of my invention is that the propellers all interact in ascending or vertical flight so that this end may be more readily attained and greater loads or weights may be lifted or carried.

In ascending, the propeller 18 constantly projects a blast or stream of compressed, dense and rapidly moving air horizontally and rearwardly against or adjacent the nearest blades of the propellers 28, which latter are rotating in opposite directions and at the same time the propellers 25, operating in the same direction to propeller 18, constantly project a blast or stream of compressed, dense and rapidly moving air forwardly against or adjacent the remaining blades of the propellers 28. The lifting action of the propellers 28 is thus augmented as they constantly push downward against a zone of dense and rapidly moving air, which so reacts on the blades of propellers 28 as to exert an upward force which lifts the machine.

The size of the various propellers is preferably proportioned as shown, namely, so that the propeller 18 will direct air against a blade of each propeller 28 and the propellers 25 will each direct air against a remaining blade of propellers 28.

In order to prevent the wings disturbing and to concentrate the action of the compressed and rapidly moving air against the blades of the propellers 28, hoods or tunnels 29 and 30 are mounted on the fuselage and legs 20, respectively, the former serving to direct air from the propeller 18 onto the relatively inner blades of propellers 28 and the latter serving to direct air onto the relatively outer blades of propellers 28. Hoods 30 are partly closed at their forward ends at 31 to aid in directing the air onto the last mentioned blades.

A vertically moving craft according to my invention is practical without wings since the latter only come into use when the machine moves forwardly or horizontally.

Various means may optionally be employed for driving the various propellers from the engine or motor 16. For instance, propeller 18 is driven directly from the motor shaft 17. Said shaft also extends rearwardly beyond the motor and has a bevel gear wheel 32 loose thereon and associated with a conventional clutch 33 whereby the same may be clutched or unclutched as desired. Adapted to mesh with gear 32, are gear wheels 34 keyed to shafts 35 appropriately journaled in the walls of the fuselage 10.

Said main shaft 17 extends into a transmission case 36 and is relayed through gears and at the rear end has sprocket wheels 37 keyed thereto over which chains 38 are trained which pass over sprocket wheels 39 on the shafts 24, forming a drive for the propellers 25. The reversing action of the propellers 25 as previously stated, is effected by a reversing gear in the transmission case 36, the specific construction for such purpose being conventional and forming no part of the invention.

The transmission within the case 36 specifically forms no part of the invention. It is operated, however, by a shift lever 36', accessible from the cockpit 11. It is further to be emphasized, however, that the transmission and drive is such that the speed of the propellers 25 may be varied in relation to the propeller 18 so as to maintain horizontal balance when the aircraft is rising or descending vertically; for varying the speed of each propeller 28 in relation to the speed of the other one as may be necessary for maintaining lateral balance; for disengaging the propellers 28 so that they will not operate while the other propellers are in motion and for reversing the direction of rotation of the propellers 25 to control the direction of thrust of the air when required for advancing or usual flight.

The wings 15 are of the underhung or low type so that sufficient air may reach the propellers 28. Such wings, however, may be higher and, if desired, irrespective of the height of the wings, openings may be provided through the wings 15 beneath the propellers 28 to function during ascent or vertical flight. For instance, such openings are shown at 40 but are closed during normal flight by closures 41 which may be hinged to the wings at 42 and have associated latches 43 to normally prevent opening thereof. This same end may be attained in various other ways as by arranging portions of the wings foldable to expose openings at times or portions thereof in telescopic relation for the same purpose.

Various changes may be resorted to within the spirit and scope of the invention such, for instance, as omitting the propellers 25 or by increasing the number of propellers according to the principles herein involved, or increasing the number of motors and altering the arrangement of the driving shafts, or altering the number of blades in the various propellers.

I claim:

1. In aircraft, horizontal lifting propellers rotatable in opposite directions and coacting flight propeller means arranged to compress and place air in rapid motion and project the same onto a blade of each of said propellers, and propeller means arranged to compress and place air in rapid motion and project the same onto another blade of each of said propellers.

2. In aircraft, horizontal lifting propellers rotatable in opposite directions and coacting flight propeller means arranged to compress and place air in rapid motion and project the same onto a blade of each of said propellers, and propeller means arranged to compress and place air in rapid motion and project the same onto another blade of each of said propellers and in the opposite direction to the first line of projection, the lines of projection being laterally spaced apart.

3. In aircraft, horizontal lifting propellers rotatable in opposite directions and coacting flight propeller means arranged to compress and place air in rapid motion and project the same onto a blade of each of said propellers, and propeller means arranged to compress and place air in rapid motion and project the same onto another blade of each of said propellers and hood means aiding in concentrating the projected air onto the intended blades.

4. In aircraft, a pair of horizontal lifting propellers, a propeller means in front thereof to compress and direct air rearwardly onto blades thereof, and propellers in the rear of the lifting propellers on opposite sides of said propeller means operable to compress and direct air forwardly onto other blades of said lifting propellers.

5. In aircraft, a pair of horizontal lifting propellers, a propeller means in front thereof to compress and direct air rearwardly onto blades thereof, and propellers in the rear of the lifting propellers on opposite sides of said propeller means operable to compress and direct air forwardly onto other blades of said lifting propellers, means whereby the lifting propellers may remain inactive and the rear propellers may oppositely impinge upon the air.

6. In aircraft, a fuselage, wings thereon, a frame connected to the fuselage and wings, a motor in the fuselage, a vertical propeller driven by said motor, lifting propellers rearwardly of the first propeller journaled on the frame, vertical propellers on said frame rearwardly of the lifting propellers and outwardly of the axes thereof and operating means for the propellers enabling each lifting propeller to be rotated at a speed variable with respect to the other, to be placed out of operation, the vertical propellers to compress direct air against the lifting propellers and the direction of projection of air from the rear lifting propellers to be reversed.

7. An aircraft comprising, in combination, a monoplane, a pair of horizontal lifting propellers mounted on vertical axes above the plane and having their tips revolving closely adjacent the central longitudinal axis of the plane, a tractor propeller mounted on a horizontal axis centrally of the leading edge of the plane and adapted to compress and direct air against the blades of said lifting propellers, and hood means adjacent said lifting propellers acting to compress and concentrate the air thereon.

ERNEST RUBIN.